No. 680,421. Patented Aug. 13, 1901.
F. C. SUTTER & R. V. BINGAY.
TRANSFORMER.
(Application filed May 23, 1901.)
(No Model.) 2 Sheets—Sheet 1.
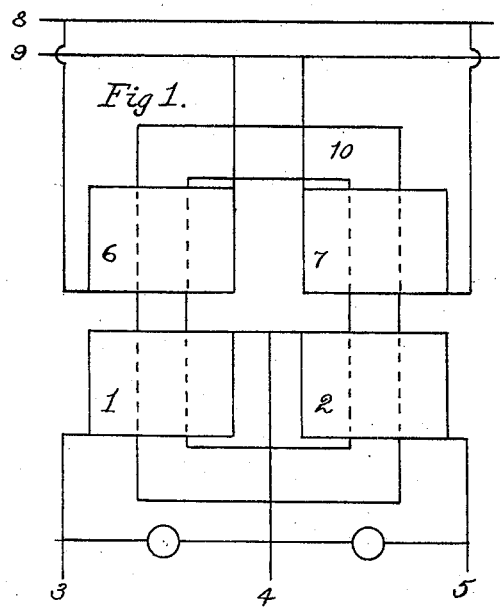
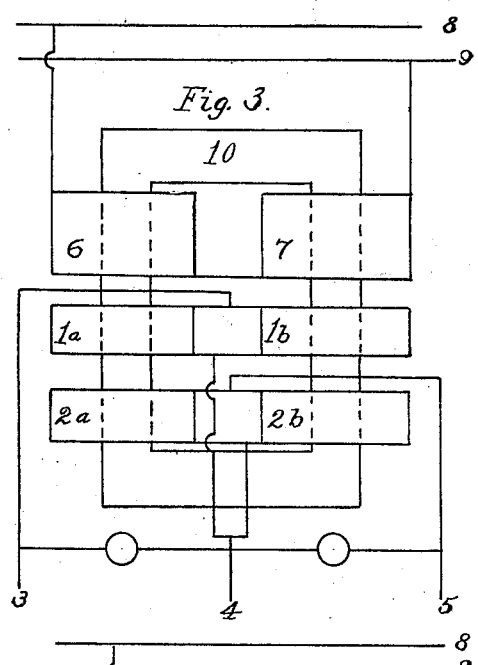
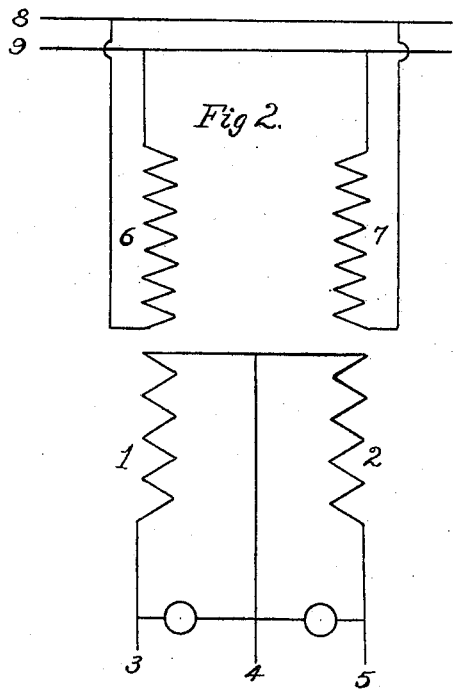
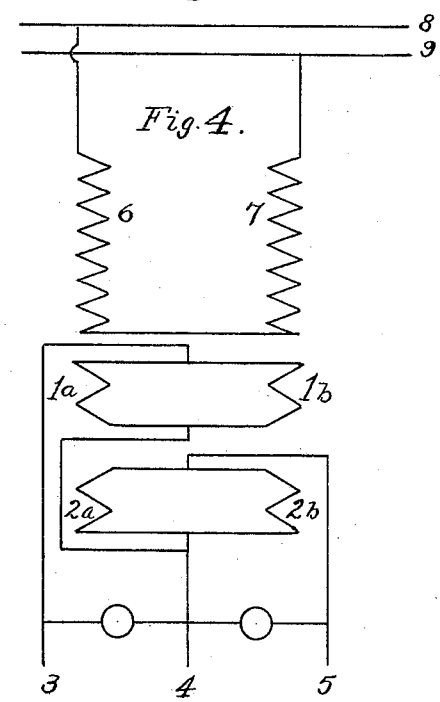
WITNESSES:
Amelia M. Koustanger
J Boyd Duff
INVENTORS
Frederick C. Sutter and
Robert V. Bingay
BY Edward A. Lawrence
their ATTORNEY.

No. 680,421. Patented Aug. 13, 1901.
F. C. SUTTER & R. V. BINGAY.
TRANSFORMER.
(Application filed May 23, 1901.)
(No Model.) 2 Sheets—Sheet 2.
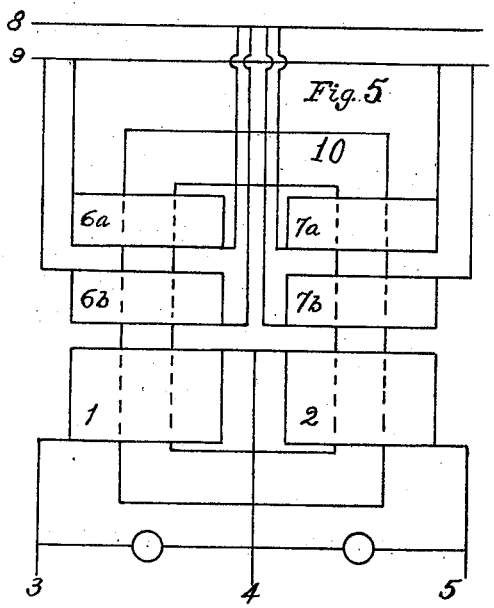
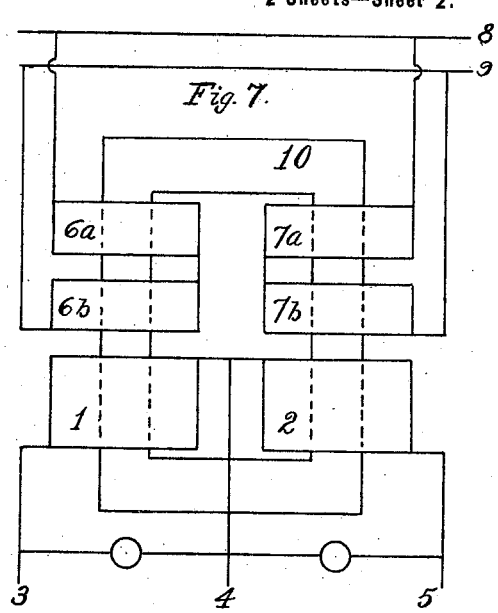
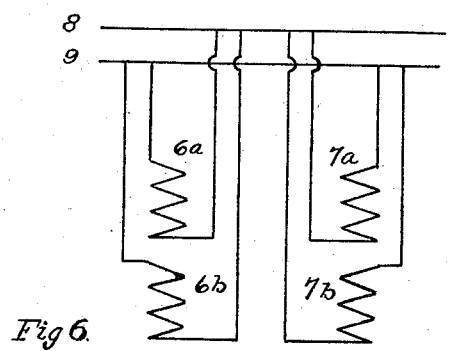
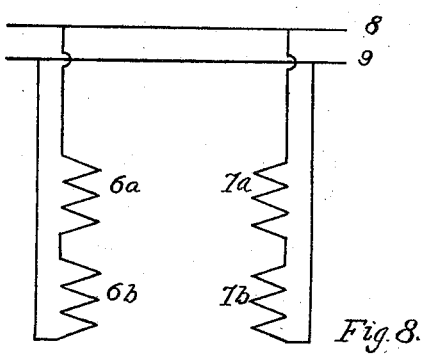
WITNESSES:
INVENTORS
Frederick C Sutter
Robert V Bingay
BY Edward A Lawrence
their ATTORNEY.
THE NORRIS PETERS CO., PHOTO-LITHO., WASHINGTON, D. C.

UNITED STATES PATENT OFFICE.

FREDERICK C. SUTTER, OF PITTSBURG, PENNSYLVANIA, AND ROBERT V. BINGAY, OF MONTREAL, CANADA.

TRANSFORMER.

SPECIFICATION forming part of Letters Patent No. 680,421, dated August 13, 1901.

Application filed May 23, 1901. Serial No. 61,520. (No model.)

*To all whom it may concern:*

Be it known that we, FREDERICK C. SUTTER, a citizen of the United States of America, and a resident of Pittsburg, county of Allegheny, State of Pennsylvania, and ROBERT V. BINGAY, a subject of the King of England, residing at Montreal, Canada, have invented certain new and useful Improvements in Transformers, of which the following is a specification.

In the drawings which make part of this specification, Figure 1 shows our transformer, having a primary consisting of two coils connected in multiple and a secondary consisting of two coils connected to a three-wire circuit. Fig. 2 is a diagram of the same. Fig. 3 shows two primary coils connected in series, while the secondary consists of a plurality of coils divided into two groups, one group being connected with one branch of the three-wire circuit and the other group being connected with the other branch of said circuit. Fig. 4 is a diagram of the same. Fig. 5 shows the primary, consisting of a plurality of coils all connected in multiple across the mains, and the secondary, consisting of two coils connected to the three-wire system. Fig. 6 is a diagram of the same. Fig. 7 shows the primary consisting of two groups of coils connected in multiple across the mains, the members of each group being connected in series; and Fig. 8 is a diagram of the same.

The invention relates to improvements in transformers for use on the three-wire system or other systems using more than three wires. The result sought is an improved regulation when the transformer is operating on such circuits.

Transformers with single magnetic circuits, the "core type," commonly so called, as usually constructed are unsatisfactory for use on the three-wire system, owing to the following phenomenon: When the loads on the various branches of the secondary circuit are unequal in amount, the regulation or drop in voltage shown by the transformer will appear abnormal. The normal drop or regulation of any given transformer, as above described, is that drop or regulation shown under a given load operated on the simple two-wire system. The effect of the same load operated on the three-wire system, but with the load unequally distributed between the branches of the circuit, will be to lower the voltage on the more heavily loaded side much below the drop that this load should exhibit, and, furthermore, the voltage on the lightly-loaded side instead of showing a drop will be found to be increased or show a negative drop.

Taking the extreme case wherein the one side is fully loaded and the other side entirely unloaded, the core-type transformer as commonly wound shows a drop in voltage on the loaded side perhaps several times greater than the normal, while the unloaded side will show a rise above normal approximately equal in value to the abnormal drop on the other side. When both sides are equally loaded, the above effect disappears and the regulation shown is the same as that on a two-wire circuit with similar loads. It is evident that the above-mentioned variations in voltage are highly unsatisfactory for light or power service, and it is the object of this invention to provide a means of overcoming this defect in the core-type transformer. It is evident that to perfectly overcome this trouble the transformer should be so constructed that the regulation shown under any possible distribution of load between the branches of the three-wire circuit should be practically the same as the regulation of the transformer operating on the simple two-wire system.

As commonly constructed the core-type transformer has been wound with two secondary coils, one on each leg of the magnetic circuit, as shown in Fig. 1, wherein 1 represents one of these coils and 2 the other. These coils are connected to the three-wire system as shown in Fig. 1, one coil being across one branch of the circuit and the other coil across the other branch. It will be evident that a greater load on one branch of the three-wire circuit than on the other will result in a flow of current through the coil connected to the loaded branch greater than the current flow in the other coil. In the extreme case with a load on one branch and none on the other a current will flow through the coil on the loaded side and none will flow through the coil on the unloaded side. The effect of this is to distort the magnetic field of the transformer, the induction in the loaded side being diminished and the induction increased in the unloaded side, thus causing the abnormal regulation mentioned above. It is evident, therefore, that if we overcome this distortion of the magnetic field the regulation exhibited will be normal.

Referring to the drawings, Fig. 1 shows one transformer with the secondary consisting of two coils 1 and 2, being connected to each side of the three-wire system 3, 4, and 5. The primary consists of two coils 6 and 7, each being wound for the full primary potential and connected in multiple across the mains 8 and 9, so that each coil receives the full primary voltage. By this arrangement the voltage on the secondary is maintained at substantially normal regulation with a balanced or unbalanced load.

Fig. 5 shows a modification of the above, the secondary being exactly the same, but the primary is wound with four coils $6^a$, $6^b$, $7^a$, and $7^b$, each coil being adapted to the full primary potential, all four coils being connected in multiple across the primary mains. Fig. 7 shows the same transformer with coils $6^a$ and $6^b$ connected in series, as are also $7^a$ and $7^b$, thus forming two sets of two coils each, which sets are connected in multiple across the primary mains. This adapts the transformer to a primary voltage twice the value of the voltage assumed in Fig. 5 and secures a primary interchangeable for these two voltages.

Fig. 3 and diagram 4 show another method of winding our transformer. In this form the primary consists of two coils which may be connected in series or in multiple, as desired, and the secondary consists of four coils $1^a$, $1^b$, $2^a$, and $2^b$. These four coils are arranged in two sets, there being two coils to each set, $1^a$ and $1^b$, and also $2^a$ and $2^b$, one coil of one set being located on one leg of the magnetic circuit 10 and the other coil of the set located on the other leg, as shown, the members of each set being connected in multiple and placed across one branch of the three-wire circuit. It is evident that with this form of secondary the current in either branch of the three-wire system is split and part passed around one leg of the magnetic circuit and the other part passed around the other leg. The magnetic circuit is thus affected alike in all parts by the secondary currents and no distortion of the field results.

We claim, broadly, the following:

1. In a transformer the combination of a core having a single magnetic circuit, a primary winding composed of sets of coils located on various parts of said core, said sets being connected in multiple across the supply-mains, and each set consisting of two or more coils which may be connected in series or in multiple with each other and a secondary winding consisting of a plurality of coils located on various parts of said core, and portions of said secondary winding connected across each of the various branches of a three-wire circuit.

2. The combination in a transformer of a core having a single magnetic circuit, a primary winding mounted thereon, and a secondary winding mounted on said core consisting of two or more groups of coils connected to a three-wire system there being an equal number of groups connected across each branch of the three-wire system, each of said groups consisting of two or more coils located on different parts of the core, and connected in multiple across the branch of the three-wire system to which said group pertains.

3. In a transformer the combination of a core having a single magnetic circuit; a secondary winding consisting of two coils connected to a three-wire circuit a single coil being connected across each branch of the circuit, a primary mounted on said core consisting of two or more sets of coils connected in multiple so that the full primary potential is applied to each set of coils, the sets consisting of one or more coils which are adapted to a series or multiple connection thus providing for more than one primary voltage, the transformer maintaining substantially normal regulation under balanced or unbalanced load.

4. The combination in a transformer of a core having a single magnetic circuit; a primary winding mounted thereon, and a secondary winding consisting of two sets of coils connected to a three-wire circuit one set being connected across one branch and the other set across the other branch of the three-wire circuit, each of said sets being composed of two coils connected in multiple, one of said coils being located on one leg of the core and the other coil located upon the other leg of said core.

Signed by us at Pittsburg, Pennsylvania, this 11th day of May, 1901.

FREDERICK C. SUTTER.
ROBERT V. BINGAY.

Witnesses:
ALEXANDER WISHART,
EDWARD A. LAWRENCE.